Patented Mar. 22, 1927.

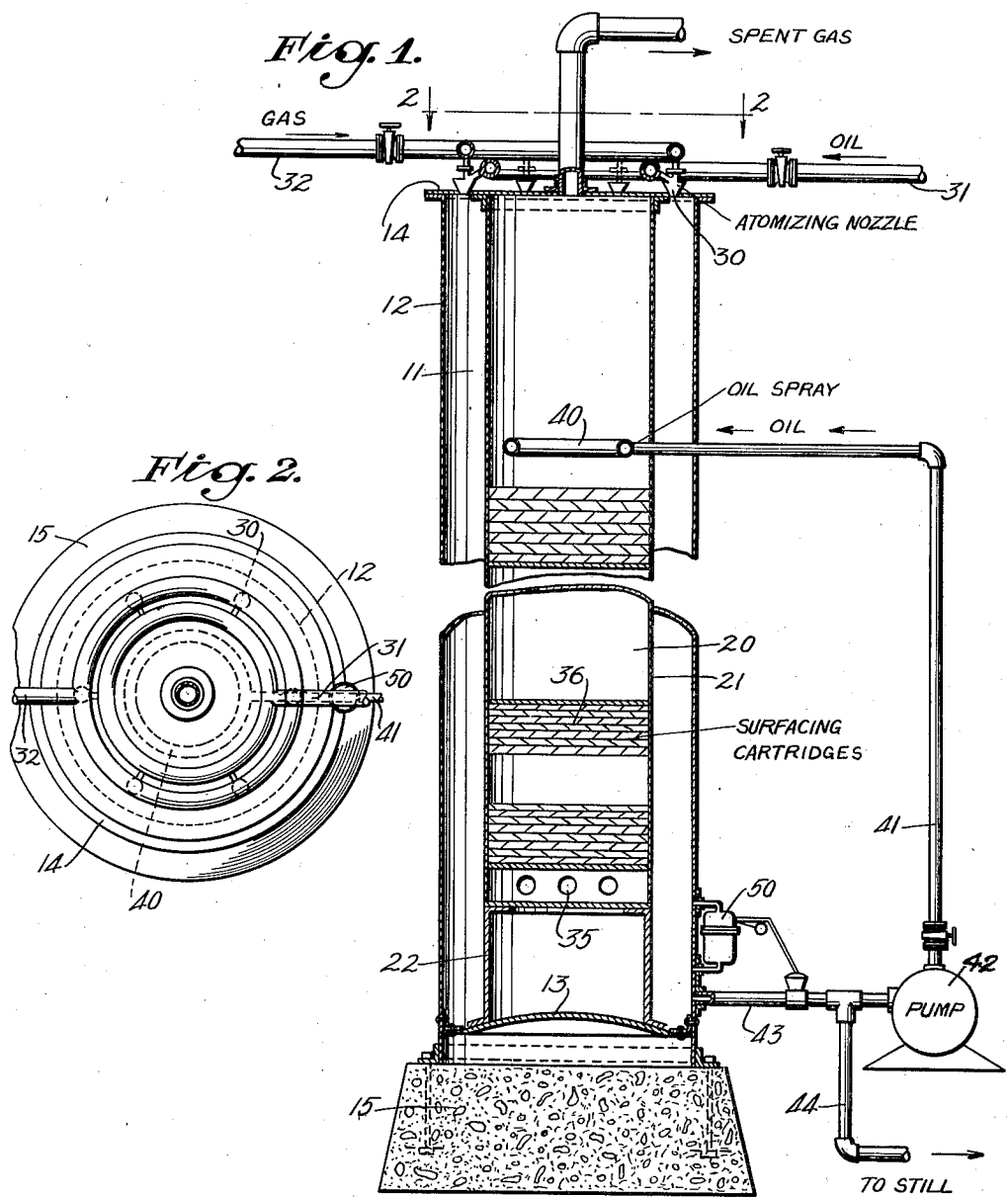

1,621,821

UNITED STATES PATENT OFFICE.

HARRY H. ARMSTRONG, OF LOS ANGELES, CALIFORNIA.

PROCESS OF RECOVERING CONDENSABLE VAPORS FROM GASES.

Application filed July 11, 1923. Serial No. 650,802.

My invention relates to the art of recovering certain volatile liquids from vapors and gases and is particularly applicable to the recovery of gasoline from natural gas. It is a well known fact that natural gas, as it comes from many wells, contains a considerable proportion of gasoline which may be recovered and saved by suitable apparatus. It is an object of my invention to provide a superior form of apparatus for this purpose.

Referring to the drawing which is for illustrative purposes only,

Fig. 1 is a side elevation partly in section of one embodiment of my invention.

Fig. 2 is a plan figure of same.

In the form of drawing shown I provide an absorbing-chamber 11 which is enclosed by a shell 12, having a tight bottom 13 and a top 14, this shell resting upon suitable foundations 15. Situated in the absorbing chamber 11 is a collecting chamber 20 formed of a shell 21 resting upon supports 22 on the bottom 13, the shell 21 being secured in gastight relationship to the top 14. Resting upon the top 14 and projecting therethrough into the chamber 11 are atomizing nozzles 30 which are supplied with an absorbent medium, such as mineral seal oil, through a pipe 31 and with the natural gas to be treated through a pipe 32. The bottom of the chamber 20 is in open communication with the chamber 11 through holes 35 formed in the shell 21.

Situated in the collecting chamber 20 is a series of surfacing cartridges 36 which may be formed of wood or metal, and which are so arranged as to provide a large surface over which absorbent medium, delivered on the top thereof through a perforated pipe 40, may flow. Oil is delivered to the pipe 40 through a pipe 41 from a pump 42, this pump taking oil from the bottom of the chamber 11 through a pipe 43. Oil is also withdrawn through the pipe 43 and through a pipe 44, to a suitable still not shown. The amount of oil taken from the bottom of the chamber 11 may be regulated by a control valve 50 of any convenient form.

The method of operation is as follows:

The absorbent oil delivered through the pipe 31 is atomized by the gas under pressure delivered through the pipe 32, this gas tending to break up the oil by means of the atomizers 30, so that a mixture of oil and gas is delivered to the top of the chamber 11. The oil in this mixture is in the form of fine drops or particles, these particles being very thoroughly mixed with the gas and presenting an enormous surface thereto. The mixture of oil and gas flows downwardly through the chamber 11, the oil particles floating in the gas and tending to absorb from the gas any gasoline vapors which may be carried in the gas. The mixture then passes through the opening 35 into the chamber 20, passing upwardly therethrough through fine openings in the surfacing cartridges 36. These cartridges are so formed as to have a large surface over which the downwardly flowing absorbent medium is spread in a thin film, so that the ascending mixture of gas and absorbent particles is brought into intimate contact with the film of absorbent medium, the particles of medium with their absorbed gasoline contents being trapped in the film and carried downwardly in that film into the bottom of the chamber 11. The absorbent medium in the bottom of the chamber is withdrawn by the pump 42 and re-circulated so that a constant stream of absorbent medium is maintained through the chamber 20, flowing downwardly in countercurrent relationship to the ascending mixture of gas and oil. A stream of absorbent medium is kept flowing through the pipe 44, the amount of medium so withdrawn being equal to the amount of absorbent delivered through the pipe 31 plus the gasoline vapor which has been absorbed thereby. The withdrawn absorbent medium is delivered through the pipe 44 to a still, not shown, in which the gasoline vapors are drawn off, the absorbent medium free from gasoline being then delivered, after cooling, to the pipe 31. The absorbent oil delivered under pressure through pipe 31 is atomized with the gas under pressure or at atmosphere or under the vacuum. Thus by reason of the fact that it may be necessary to put a vacuum through the entire system and even under a vacuum, the transfer of gasoline vapors to an absorbent medium is possible.

It will be seen that my invention contemplates an extremely minute division of the absorbent medium so that it forms a mist. The fine particles of absorbent medium are then allowed to float in the gas through the chamber 11, presenting a very large absorbing surface to the gas so that the absorbing efficiency is very high. The mist is then allowed to enter the chamber 20 in which the particles of absorbent are collected therefrom by the thin film of liquid absorbent flowing downwardly therethrough. The expansion of the gas in the chamber 11 tends to lower the temperature of this chamber and of the chamber 20 which is surrounded thereby. It is a well known fact that the absorption of gasoline from natural gases by any of the well known absorbing mediums is greatly facilitated by low temperatures.

I claim as my invention:

1. A process of recovering condensable vapors from a gas which comprises: atomizing a liquid absorbent agent by means of the gas; allowing the atomized particles of absorbent medium to pass through an enclosed space in intimate contact with said gas; and passing the mixture of gas and atomized particles into a chamber in which said mixture is brought into intimate contact with unatomized liquid absorbent which is circulated through said chamber.

2. A process of recovering condensable vapors from a gas which comprises: atomizing a liquid absorbent agent by means of the gas; allowing the atomized particles of absorbent medium to pass through an enclosed space in intimate contact with said gas; and passing the mixture of gas and atomized particles into a chamber in which said mixture is brought into intimate contact with unatomized liquid absorbent which is circulated through said chamber in countercurrent to the flow of said mixture through said chamber.

3. A process of recovering condensable vapors from a gas which comprises: atomizing a liquid absorbent agent by means of the gas; allowing the atomized particles of absorbent medium to fall downwardly through an enclosed space in intimate contact with said gas; and passing the mixture of gas and atomized particles upwardly through a chamber in which said mixture is brought into intimate contact with unatomized liquid absorbent.

4. A process of recovering condensable vapors from a gas which comprises: atomizing a liquid absorbent agent by means of the gas; allowing the atomized particles of absorbent medium to fall downwardly through an enclosed space in intimate contact with said gas; and passing the mixture of gas and atomized particles upwardly through a chamber in which said mixture is brought into intimate contact with unatomized liquid absorbent, said unatomized liquid absorbent being circulated downwardly through said chamber in counter-current to the upward flow of said mixture of gas and atomized particles.

5. A process of recovering condensable vapors from a gas which comprises: atomizing a liquid absorbent agent by means of the gas; allowing the atomized particles of absorbent medium to fall downwardly through an enclosed space in intimate contact with said gas; and passing the mixture of gas and atomized particles upwardly through a chamber in which said mixture is brought into intimate contact with unatomized liquid absorbent, said chamber being disposed within said enclosed space to permit heat transfer therebetween.

6. A process of recovering condensable vapors from a gas which comprises: atomizing a liquid absorbent agent by means of the gas; allowing the atomized particles of absorbent medium to fall downwardly through an enclosed space in intimate contact with said gas; and passing the mixture of gas and atomized particles upwardly through a chamber in which said mixture is brought into intimate contact with unatomized liquid absorbent, said unatomized liquid absorbent being circulated downwardly through said chamber in counter-current to the upward flow of said mixture of gas and atomized particles, said chamber being disposed within said enclosed space to permit heat transfer therebetween.

7. A process of recovering condensable vapors from a gas which comprises: atomizing a liquid absorbent agent by means of the gas; allowing the atomized particles of absorbent medium to pass through an enclosed space in intimate contact with said gas; and passing the mixture of gas and atomized particles upwardly through a chamber in which said mixture is brought into intimate contact with unatomized liquid absorbent which is circulated through said chamber.

8. A process of recovering condensable vapors from a gas which comprises: atomizing a liquid absorbent agent by means of the gas; allowing the atomized particles of absorbent medium to pass through an enclosed space in intimate contact with said gas; and passing the mixture of gas and atomized particles upwardly through a chamber in which said mixture is brought into intimate contact with unatomized liquid absorbent which is circulated downwardly through said chamber.

In testimony whereof, I have hereunto set my hand at Los Angeles, California, this 30 day of June 1923.

HARRY H. ARMSTRONG.